(12) United States Patent
Crognale et al.

(10) Patent No.: US 11,581,952 B2
(45) Date of Patent: Feb. 14, 2023

(54) OPTICAL CHANNEL PLAN PROCESS

(71) Applicant: Cisco Technology, Inc., San Jose, CA (US)

(72) Inventors: Claudio Crognale, Monza (IT); Giovanni Marenco, Novara (IT); Maurizio Di Vizio, Lodi (IT); Silvia Turolla, Vedano al Lambro (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/352,705

(22) Filed: Jun. 21, 2021

(65) Prior Publication Data

US 2022/0407608 A1 Dec. 22, 2022

(51) Int. Cl.
*H04J 14/02* (2006.01)
*H04B 10/69* (2013.01)
*H04B 17/336* (2015.01)
*H04B 10/079* (2013.01)

(52) U.S. Cl.
CPC ... *H04B 10/6932* (2013.01); *H04B 10/07953* (2013.01); *H04B 10/07955* (2013.01); *H04B 17/336* (2015.01); *H04J 14/0227* (2013.01)

(58) Field of Classification Search
CPC .......................................... H04J 14/0226–026
See application file for complete search history.

(56) References Cited

U.S. PATENT DOCUMENTS 10,873,411 B1 * 12/2020 Marenco ............. H04J 14/0227
2009/0196602 A1 * 8/2009 Saunders ........... H04B 10/5055
398/9
2016/0072587 A1 3/2016 Pilipetskii et al.
2019/0319702 A1 10/2019 Gazzola et al.
2019/0363789 A1 * 11/2019 Lee ........................ H04B 10/50
2019/0379480 A1 * 12/2019 Tanzi ............... H04B 10/07953
2019/0386766 A1 12/2019 Swinkels et al.
2020/0076501 A1 3/2020 Searcy et al.
(Continued)

OTHER PUBLICATIONS

Cisco, "Maximize Spectral Efficiency on Optical Links Using Cisco Automated Subsea Tuning", Apr. 29, 2020, 26 pages.
(Continued)

*Primary Examiner* — Nathan M Cors
(74) *Attorney, Agent, or Firm* — Edell, Shapiro & Finnan, LLC

(57) ABSTRACT

Methods for configuring an optical link in which a distribution of transmission data rates and line rates are configured for a predetermined amount of optical bandwidth to maximize transmission capacity. In these methods, a controller of an optical network obtains input parameters that include a signal-to-noise ratio (SNR) for optical signals and an allocated bandwidth of the optical link, further obtains, for each line rate, a mapping of transmission data rates along a frequency spectrum of the allocated bandwidth compatible with the SNR, and generates a channel plan in which a number of traffic modes and a distribution of a plurality of channels in the allocated bandwidth are set to maximize transmission capacity. The plurality of channels is used for transmitting the signals on the optical link. The controller configures at least one optical network element in the optical network to establish the optical link based on the channel plan.

20 Claims, 13 Drawing Sheets

(56) References Cited

U.S. PATENT DOCUMENTS

2020/0127733 A1\* 4/2020 Eira ................... H04B 10/0795
2021/0126732 A1   4/2021 Marenco et al.
2021/0351842 A1\* 11/2021 Kawahara ................. G01J 3/28

OTHER PUBLICATIONS

Elizabeth Rivera Hartling, et al, "Subsea Open Cables: A Practical Perspective on the Guidelines and Gotchas", SubOptic, Apr. 7, 2019, 56 pages.

\* cited by examiner

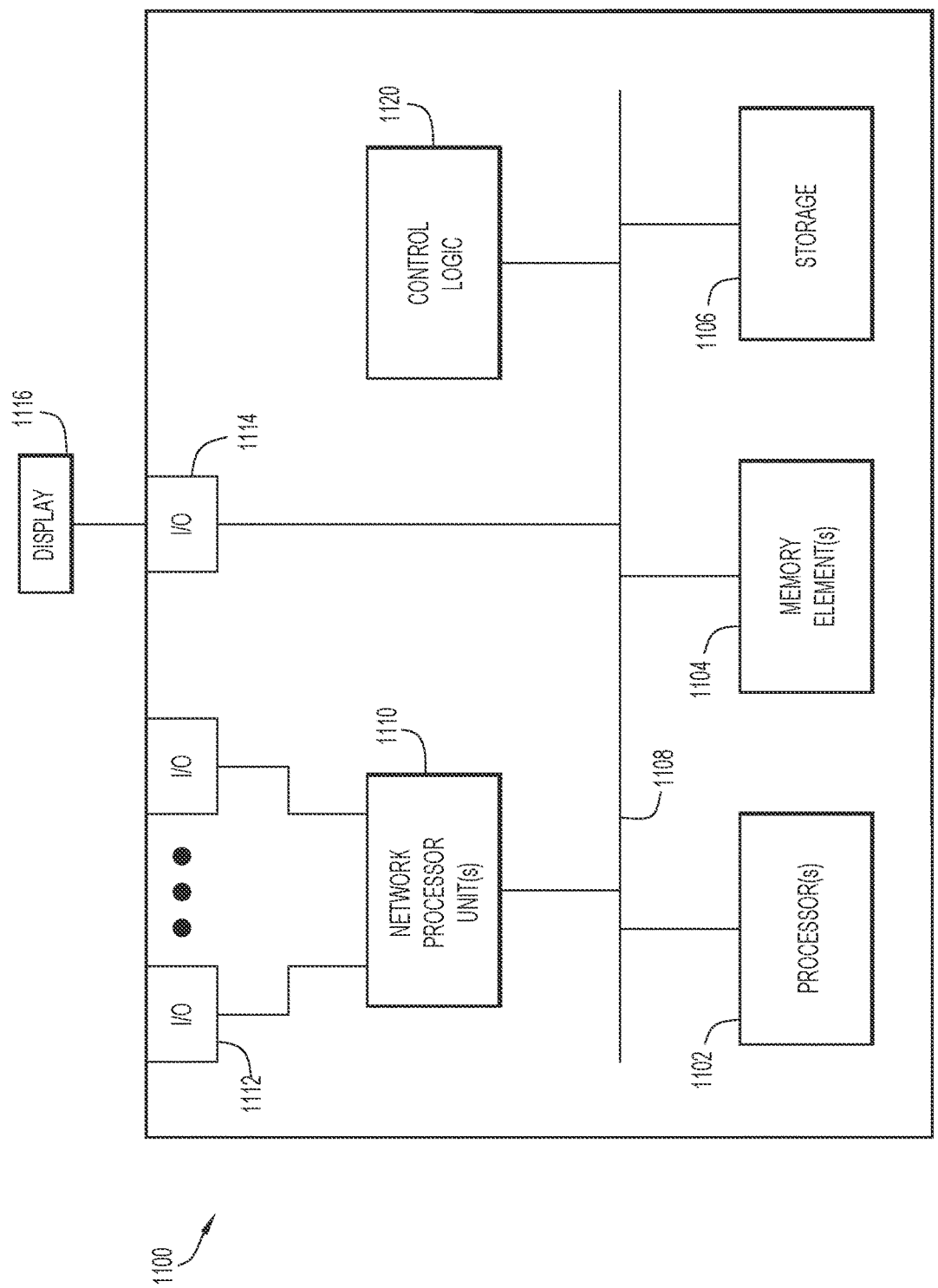

OPTICAL CHANNEL PLAN PROCESS

TECHNICAL FIELD

The present disclosure relates to optical networks.

BACKGROUND

Optical networks are commonly employed to transmit data across long distances. Wavelength-division multiplexing (WDM) and dense wavelength-divisional multiplexing (DWDM) techniques may be employed to improve the spectral efficiency of an optical network. WDM and DWDM techniques involve transmitting data in optical signals at different wavelengths over a common or shared optical fiber, sometimes referred to as an optical link or an optical fiber cable. One example of this optical link is a Network Convergence System (NCS) 1004-based DWDM Submarine Optical Link that stretches on an ocean floor.

When an optical link is installed, it needs to be configured. To configure the optical link, knowledge of the channel allocation into an allowed bandwidth is performed. From an operating point of view, this channels allocation is determined by a channel plan i.e. a table of values that provide various possible channel allocations into an assigned portion of the frequency spectrum. A network operator may attempt to maximize link transmission capacity by manually configuring the optical link into the allowed bandwidth. This is a complex process that is time-consuming and does not always result in a maximized transmission capacity.

BRIEF DESCRIPTION OF THE DRAWINGS

FIG. 11 is a hardware block diagram of a computing device configured to perform the techniques of maximizing capacity of the optical link, according to various example embodiments.

DESCRIPTION OF EXAMPLE EMBODIMENTS

Overview

Figure 1:
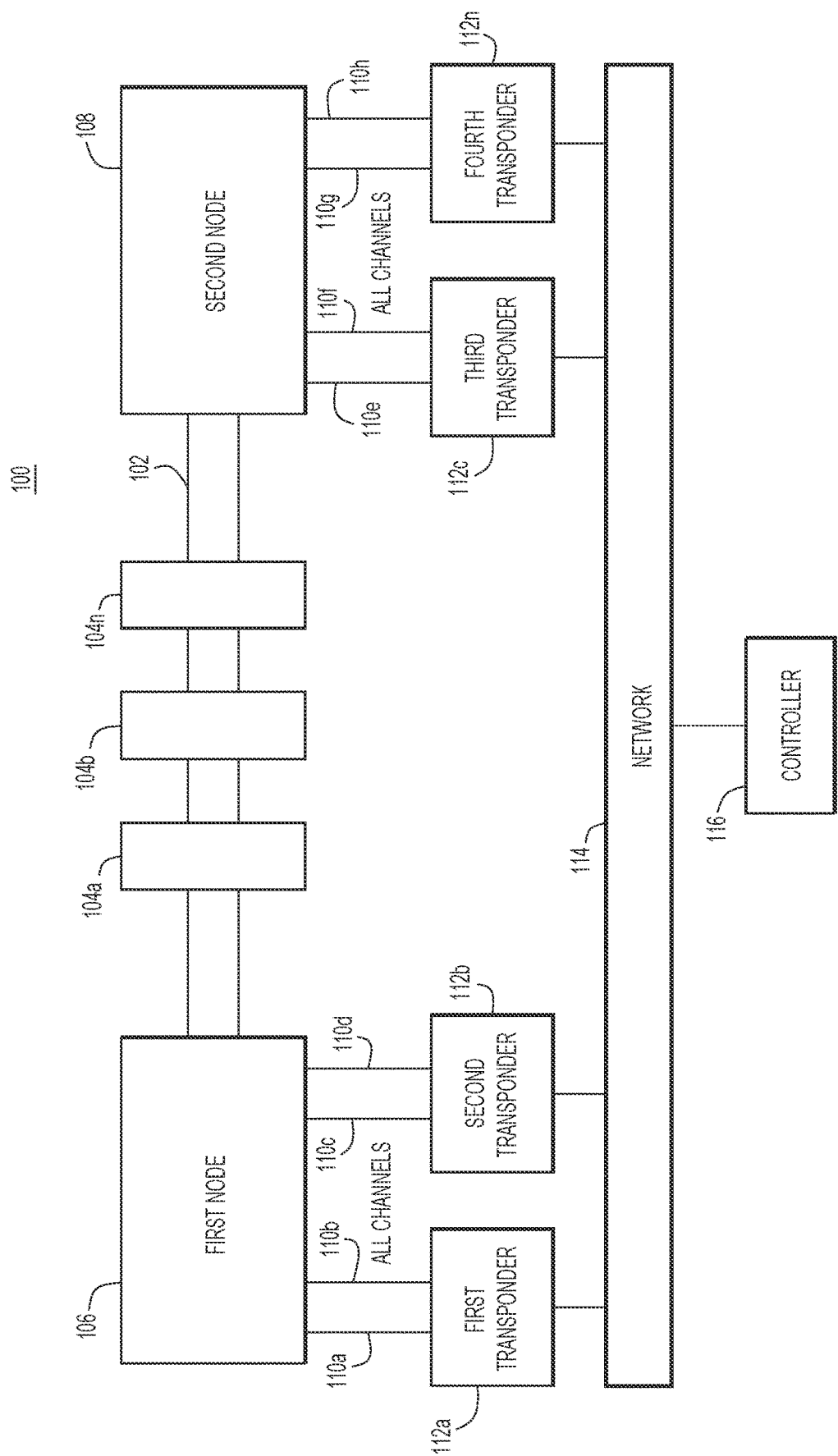
FIG. 1 is a block diagram illustrating an environment in which transmission capacity of an optical link may be configured using an automatic channel plan process for subsea applications, according to an example embodiment.

Briefly, methods for configuring an optical link with a desired distribution of baud rates and lines rates in a predetermined amount of bandwidth are provided. In these methods, a controller of an optical network obtains input parameters that include a signal-to-noise ratio (SNR) for optical signals and an allocated bandwidth of an optical link in the optical network and obtains, for each line rate, a mapping of transmission data rates along a frequency spectrum of the allocated bandwidth compatible with the SNR. The controller further generates a channel plan in which a number of traffic modes and a distribution of a plurality of channels in the allocated bandwidth are set to maximize transmission capacity of the optical link. The plurality of channels is used for transmitting the optical signals on the optical link. The controller further configures at least one couple of optical network elements in the optical network, to establish the optical link based on the channel plan.

EXAMPLE EMBODIMENTS

To facilitate the configuration of an optical link, conventional techniques involve a characterization of optical line cards that is exploited in test settings, such as laboratories. Typically, system specifications and advanced theoretical analysis are used to predict performance of the optical link. Specifically, in submarine link applications, the installation of the system in the field requires knowledge of the channel allocation into an allowed bandwidth. From an operating point of view, this channel allocation is given by a channel plan (a table of values offering possible channel allocations into an assigned portion of a frequency spectrum). Typically, this operation is performed by allocating, into the allowed bandwidth, a reasonable distribution of traffic modes. However, this does not lead to the maximum link transmission capacity because it is derived by a theoretical procedure that is manually carried out. As such, it does not consider all degrees of freedom of this problem. Moreover, the theoretical channel plan may provide a different traffic mode for each channel, and this would be impractical for installation. In fact, network operators prefer only a limited amount of traffic modes to be used to maximize system capacity, and this constraint creates further difficulties in manual configuration of the channel capacity. In short, experimentally deriving the number of traffic modes and maximizing the system capacity cannot be achieved with a manual approach.

In one or more example embodiments, an optical link is configured to maximize transmission capacity using techniques that generate a channel plan for an assigned bandwidth with a traffic mode distribution based on a maximum number of traffic modes designated by an operator or user. That is, the techniques estimate a distribution of baud rates and line rates in a predetermined amount of optical bandwidth to maximize transmission capacity.

A Binary Interleaved Hybrid Code Modulation technology (BIHCM) provides for allocating the channels into an assigned bandwidth by maximizing the overall system capacity (given by the sum of all line rates brought by the channels into a DWDM channel comb). For a given maximum value of traffic modes that the network operator desires to use to allocate the channels into an assigned bandwidth, the system capacity can be designed by implementing an optical channel plan process, detailed below.

FIG. 1 is a block diagram illustrating an optical network 100 in which transmission capacity of an optical link may be designed using optical channel plan process, according to an example embodiment.

The optical network 100 may employ WDM or DWDM technologies. The optical network 100 includes optical links or lines (collectively or individually referred to as an optical link 102), optical amplifiers 104a, 104b, . . . 104n along a path between a first node 106 and a second node 108. The optical network 100 further includes optical network elements, such as a first transponder 112a, a second transponder 112b, a third transponder 112c, and a fourth transponder 112n. A controller 116 is provided that is in communication with the transponders 112a-112n via a network 114.

The transponders 112a-112n are coupled via optical fibers to the respective first node 106 and second node 108. For example, the first transponder 112a is coupled via a first optical fiber 110a and a second optical fiber 110b to the first node 106. The first optical fiber 110a carries an optical signal to the first node 106 from the first transponder 112a, and the second optical fiber 110b carries an optical signal from the first node 106 to the first transponder 112a. The optical signal carried in the fibers 110a and 110b spans various DWDM channels. Similarly, the second transponder 112b is coupled via optical fibers 110c and 110d to the first node 106, the third transponder 112c is coupled via optical fibers 110e and 110f to the second node 108, and the fourth transponder 112n is coupled via the optical fibers 110g and 110h also to the second node 108. The first node 106 handles the DWDM channels via the respective optical fibers 110a, 110b, 110c and 110d and similarly the second node 108 handles the DWDM channels via the respective optical fibers 110e, 110f, 110g and 110h.

The notation a, b, c, n illustrates that the number of elements can vary depending on a particular implementation and is not limited to the number of elements depicted in the optical network 100.

In FIG. 1, the optical link 102 is connected between two terminal points or nodes (a first node 106 and a second node 108) without any filtering elements therein between. The optical link 102 may include the optical amplifiers 104a-104n provided to assist in propagating the optical signals along the length of the optical link 102. An example of the optical link 102 is one or more subterranean optical fibers or cables that transmit optical signals between the first node 106 and the second node 108 i.e., for bidirectional communication.

An example of the first node 106 and the second node 108 is an optical add/drop multiplexer (OADM) or a reconfigurable optical add/drop multiplexer (ROADM). The OADM or ROADM serves as an aggregation node when it transmits the optical signal via the optical link 102 and serves as a disaggregation node when it receives the optical signal from the optical link 102.

An aggregation node, i.e., first node 106 and second node 108, aggregates or combines optical signals received from some of the data sources i.e. the transponders 112a-112n. A disaggregation node separates the optical signals received from the optical link 102 and provides the separated optical signals to some of the data sources via some of the optical fibers 110a, 110b, 110c, 110d, 110e, 110f, and 110g. For example, the first transponder 112a transmits data to the first node 106 via a first optical fiber 110a and receives data from the first node 106 via a second optical fiber 110b. Analogously, the other data sources (transponders) transmit and receive data to a respective node via respective optical fibers, as shown in FIG. 1.

The first transponder 112a, second transponder 112b, third transponder 112c, and fourth transponder 112n may include components configured to provide bidirectional communication. For example, each of these optical network elements may include an optical transmitter and an optical receiver. The optical transmitter includes a transmit module and a transmitter digital signal processor (DSP) and an optical receiver include a receiver module and a receiver DSP. The transmit module and the receive module may be optical pluggable modules configured to transmit and receive optical signals, respectively. The DSPs process the optical signals and perform various signal processing operations, such as changing transmission parameters. These optical network elements may further include a processor and a memory. The processor controls the components of its optical network element, may change transmission parameters, and evaluate quality of signal (QoS) based on the information from the DSPs. The processor within each of the transponders 112a-112n changes the transmission parameters based on instructions from the controller 116.

The controller 116 controls the overall configuration of the optical network and communicates with the optical network elements via the network 114. The controller 116 symmetrically configures the optical network elements according to configuration parameters of the optical link 102 based on the techniques presented herein.

Figure 2:
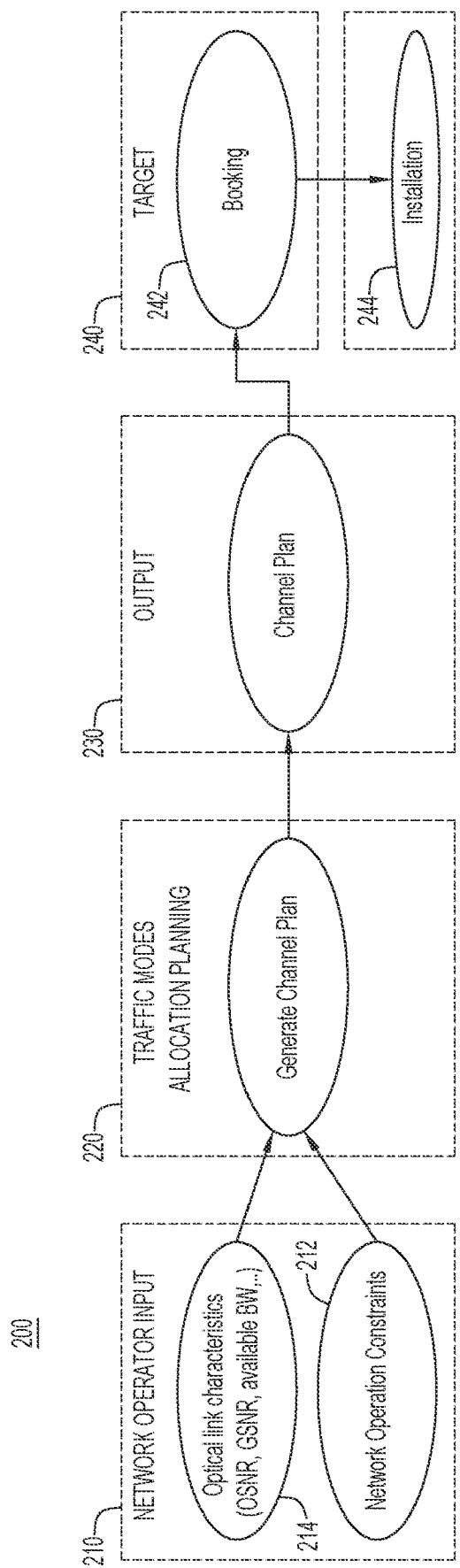
FIG. 2 is a diagram illustrating stages of a process for deriving a channel plan that maximizes capacity for a given bandwidth of an optical link, according to an example embodiment.

Reference is now made to FIG. 2. FIG. 2 illustrates stages of a process 200 for deriving a channel plan that maximizes capacity for a given bandwidth of the optical link 102 of FIG. 1, according to an example embodiment. The stages of the process 200 may be performed by the controller 116. Reference is also made to FIG. 1 for purposes of the description of the stages of the process 200.

The process 200 derives a best possible combination of (a limited number of) allowed traffic-modes among all possible combinations compatible with physical characteristics of the optical link 102 and configure the optical link 102 based on the derived channel plan. The optical link 102 is configured based on tuning configuration parameters at a couple of optical network elements such as optical transceivers at both ends of the optical link 102. The process 200 includes stage 210, stage 220, stage 230, and stage 240.

Stage 210 involves obtaining or inputting configuration parameters of the optical link 102. Specifically, network operation constraints 212 and optical link characteristics 214 are determined and/or obtained. Below are some non-limiting examples of the input configuration parameters obtained at Stage 1 210.

Network operation constraints 212 include maximum number of traffic modes (e.g., four traffic modes), an overall allowed bandwidth, and/or other parameters. The other parameters may include, by way of an example, minimum optical signal-to-noise ratio (OSNR)/general signal-to-noise ratio (GSNR) margin, structure of the optical link 102 such as submarine line transmission equipment (SLTE) thereon. Network operation constraints 212 may also include experimentally derived results, explained below.

Optical link characteristics 214 include physical characteristics of the optical link 102. For example, optical link characteristics 214 may include average GSNR, minimum GSNR, maximum GSNR and/or SNR margin, or any other characteristics related to GSNR of the optical link 102. As an example, the optical link characteristics 214 may include a single worst GSNR value of the optical link 102 that is known or a trend of GSNR values across available bandwidth or frequency spectrum (referred herein interchangeably) of the optical link 102. The optical link characteristics may further include number of spans, span lengths, number of amplifiers, number of add-drop unit ports, and so on.

In one example, the OSNR in a WDM coherent system is defined as the ratio between the average signal optical power per channel and the power of an amplified spontaneous emission (ASE) noise which falls within an optical bandwidth (BW)=12.5 GHz.

$$OSNR = \frac{\text{Signal Power}}{\text{ASE Power}(12.5 \text{ GHz})}.$$

The generalized OSNR (GOSNR) further considers non-linear interference (NLI) that may occur due to bents in the optical link 102. The NLI is Gaussian white noise added to a receiver bandwidth similar to the ASE noise. The GOSNR takes into account both the ASE noise and the NLI noise as follows:

$$GOSNR = \left(\frac{1}{10^{OSNR}\text{dB}/10} + \frac{1}{10^{OSNR}NLI\text{dB}/10}\right)^{-1}.$$

For a Nyquist channel, it is customary to scale the OSNR and the GOSNR to the BW=12.5 GHz. In dB units, this involves subtracting the ratio between the signal baud rate and the optical BW as follows:

$$SNR_{dB} = OSNR_{dB} - 10 \cdot \text{Log}\left(\frac{BR}{ResBW}\right),$$

$$GSNR_{dB} = GOSNR_{dB} - 10 \cdot \text{Log}\left(\frac{BR}{ResBW}\right),$$

where ResBW is the resolution BW.

The input configuration parameters may include receiver required OSNR (ROSNR), which is a minimum value of the OSNR at the receiver side in order to obtain a value of a post forward error correction (FEC) bit error rate (BER) equal to 1E-15. The input configuration parameters may include a required SNR (RSNR), which is a corresponding value of ROSNR scaled by the BW=12.5 GHz. Additionally or alternatively, a Q-Factor may be included, which is a metric equivalent to a Pre-FEC BER. In terms of the Q-Factor, the performance of the optical link may be derived by measuring the Pre FEC BER, and converting it into a Q-Factor as follows:

$$Q_{dB} = 10 \cdot \text{Log}_{10}\{2 \cdot [Erfc^{-1}(2 \cdot \text{PreFEC BER})]^2\}.$$

Stage 220 involves generating the channel plan. The channel plan generation stage is configured to derive a distribution of the GSNR vs. frequency along the overall allowed bandwidth. The channel plan generation stage is further configured to map the GSNR along the frequency distribution onto a corresponding transmission data rate (such as a baud-rate) along the frequency distribution for each line-rate compatible with the GSNR vs. frequency distribution or, if the traffic modes are derived experimentally, exploit this input to create the transmission data rate vs. frequency distribution for each line-rate. Given the number of line-rates, the stage 220 of the channel plan generation is further configured to calculate an entire set of traffic modes into the assigned bandwidth within the specified maximum number of traffic modes allowed and allocate the channels into the bandwidth according to the input configuration parameters of Stage 210. The operations of Stage 220 are described in detail below with reference to FIGS. 3-9.

Stage 230 involves obtaining the channel plan generated in Stage 220. The channel plan may specify one or more of a maximum transmission capacity of the optical link 102 obtained using the channel plan, number of transmission data rates and line rates, start and stop frequencies for each channel, left and right guard band. By way of an example, the input configuration parameters of Stage 210 may include:

4 traffic modes (1 line-rate and 4 baud-rates "BR"),
 allocated bandwidth 4500 GHZ,
 GSNR min 9.52 dB and max 11.52 dB.

Based on the channel plan generation of Stage 220, the channel plan may include:

Maximum Capacity Gbits/s: 20000.0,
 Number of Channels: 80.00497279309734,
 Baud Rates (GBaud):
  1) BR1: 57.414, number of BR1: 19;
  2) BR2: 54.47234644444445, number of BR2: 19;
  3) BR3: 51.77789066666667, number of BR3: 20; and
  4) BR4: 49.05871511111111, number of BR4: 22.00.

The total allocated bandwidth in the channel plan is 4490.400000000002 GHz. The external left guard band is set to 6.25 GHz and the external right guard band is set to 0.0 in GHz.

Stage 240 involves applying the channel plan of Stage 230 to the target (one or more network elements to establish the optical link 102). The network elements may include the first node 106 and the second node 108, which are optical transceivers. By configuring the first node 106 and the second node 108 according to the channel plan, the transmission capacity of the optical link 102 is maximized.

Stage 240 involves, at 242, booking or reserving configuration parameters indicated in the channel plan for establishing the optical link 102 and performing the actual installation 244 or configuring one or more optical network elements to establish the optical link 102 based on the channel plan and/or the reserved parameters. The channel plan provides a list of parameters that include information for an operator to install a proper number of line cards and to perform system configurations.

Figure 3:
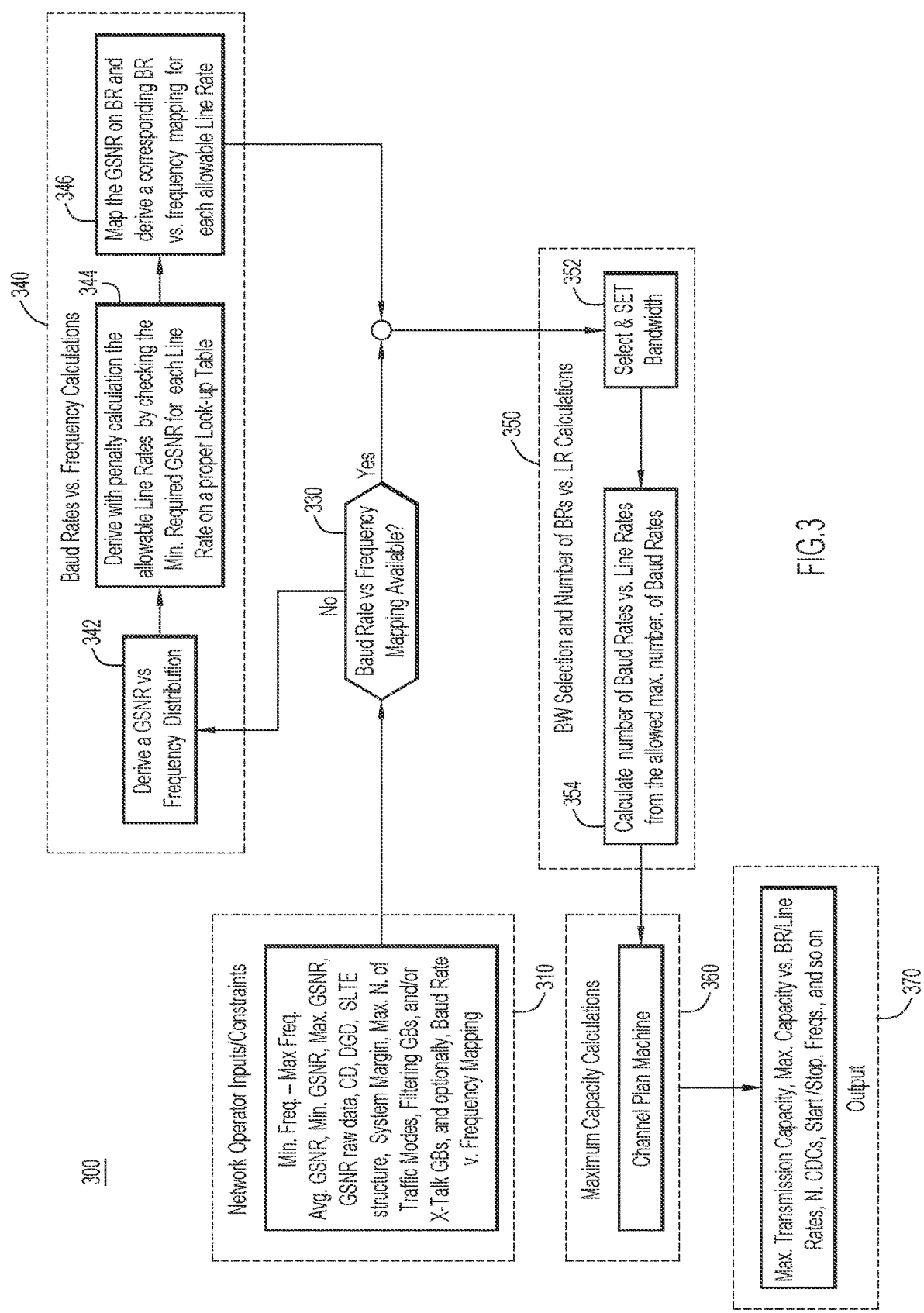
FIG. 3 is a flow diagram illustrating a method of deriving a channel plan that maximizes the capacity for a given bandwidth of an optical link, according to an example embodiment.

FIG. 3 is a flow diagram illustrating a method 300 of deriving a channel plan that maximizes the capacity for a given bandwidth of an optical link, according to an example embodiment.

At 310, network operator inputs and/or constraints are obtained. Specifically, these inputs may include one or more of: minimum and maximum frequency (allocated bandwidth), average GSNR, minimum GSNR, maximum GSNR, GSNR raw data, chromatic dispersion (CD), number of amplifiers, differential group delay (DGD), Polarization Mode Dispersion (PMD), SLTE structure, system margin, SNR margin, Q-margin, maximum number (Max N.) of traffic modes, filtering guard bands (GBs)— distance in terms of frequency, X-Talk GBs— distance between one channel to another channel, internal guard bands, and other parameters. While GSNR parameters are provided, this is one example of various other performance parameters, such as OSNR, that may be used to generate a channel plan.

Additionally, experimentally derived inputs of baud rates vs. frequency mapping may be provided as part of input, at

310. Baud rate is one example and other transmission data rate parameters may be used. The baud rates vs. frequency mapping is calculated once for a given set of physical characteristics of the optical link 102 and input for subsequent calculations of a channel plan.

At 330, the method 300 involves determining whether all the required inputs are obtained. For example, if baud rates along the frequency distribution mapping is not input at 310, the method 300 proceeds to calculate the baud rate vs. frequency mapping at 340.

At 340, the baud rates vs frequency mapping is calculated based on the inputs at 310. The inputs may include characteristics information of the optical link 102 such as minimum, maximum, and/or average GSNR, SNR margin, etc. The inputs may further designate a number of allowed traffic modes. The baud rates vs. frequency mapping is calculated as follows.

At 342, the GSNR vs. frequency distribution along the overall allowed bandwidth is derived using the inputs of 310. The distribution may be obtained using an interpolation technique.

At 344, allowable line rates are selected. Specifically, the allowable line rates are derived with a penalty calculation by checking the minimum required GSNR for each line rate using a lookup table. That is, penalties are introduced for each line rate and a determination is made whether the respective line rate meets a minimum required SNR (RSNR).

At 346, using another lookup table, the GSNR is mapped onto a baud rate to derive a baud rate along a frequency spectrum for each allowable line rate. In other words, for each line rate, baud rates compatible with the GSNR along the frequency distribution are derived. The controller 116 stores the calculated baud rates vs. frequency mapping.

At 350, the method 300 involves performing traffic mode allocation planning that includes a bandwidth (BW) selection and determining a number of baud-rate (BRs) vs. line rates (LRs) combinations. Specifically, at 352, bandwidth is selected and set according to inputs of 310. At 354, given a number of line rates that are compatible with the GSNR distribution of 340, the controller 116 calculates an entire set of traffic modes that can be generated into the assigned bandwidth within a specified maximum number of traffic modes (if one is provided at 310).

At 360, the method 300 involves executing a channel plan machine to obtain highest performance of the optical link 102 given network operator constraints and link characteristics obtained at 310. The channel plan machine derives channel allocations and then capacity related to each sequence of traffic modes (each possible combination), thereby maximizing transmission capacity of the optical link 102 and obtaining highest transmission capacity of the optical link 102.

At 370, the method 300 involves outputting parameters for configuring the optical link 102. Configuration parameters may include maximum transmission capacity, maximum capacity vs. baud rate/line rates, number of channels to be allocated into the bandwidth, start and stop frequencies of various channels, channel line rates, channel baud rates, channel center frequency, channel spacing, channel power, guard bands, and so on. The configuration parameters allow for an installation of a proper number of line cards at one or more nodes 106 and 108 and to properly configure the optical system to establish the optical link 102 with a maximized transmission capacity.

Referring next to FIGS. 4-9, diagrams are provided that illustrate operations 340-360 of FIG. 3 in further detail, according to one or more example embodiments.

Figure 4:
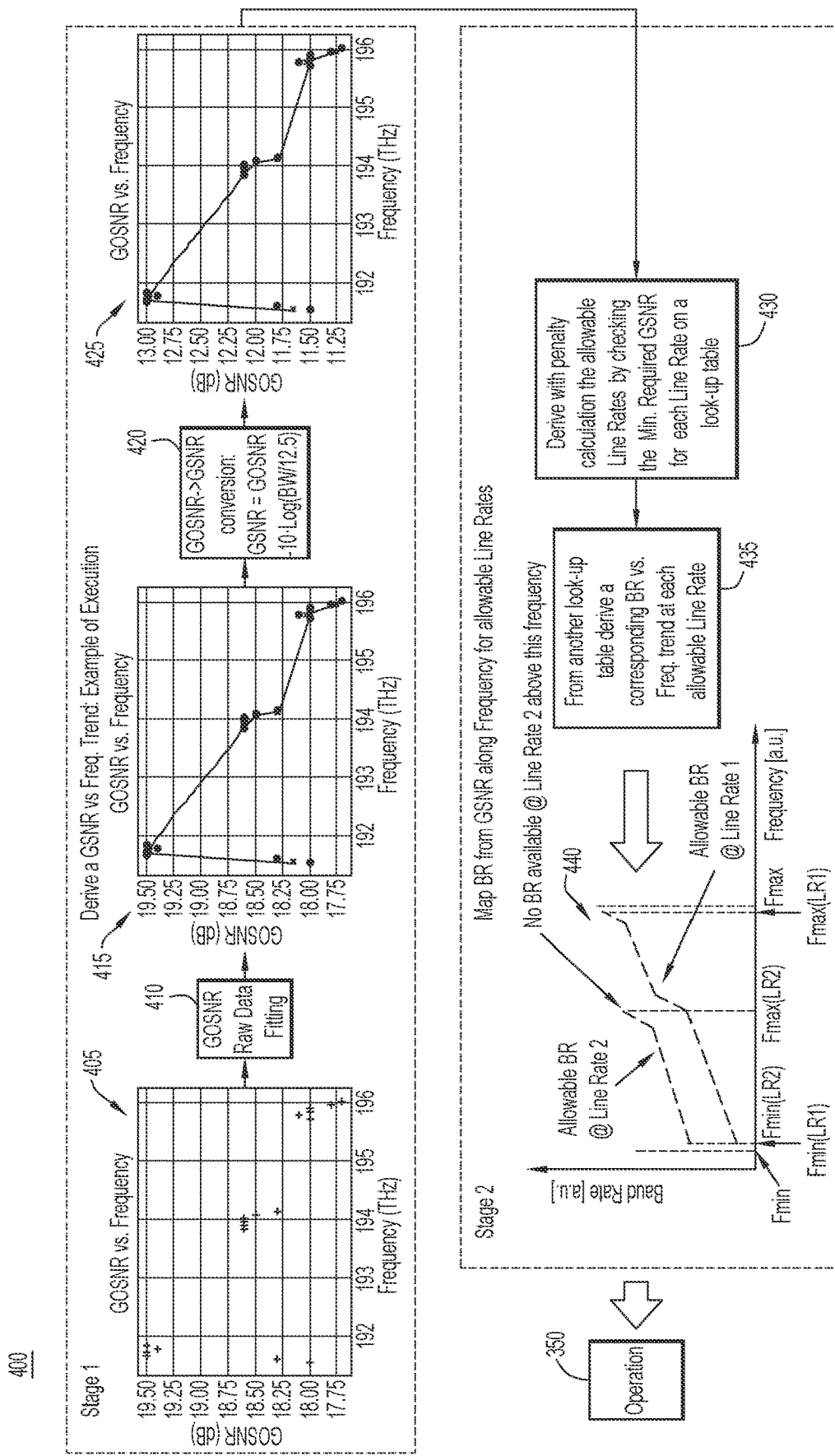
FIG. 4 is a flow diagram illustrating a method of generating a baud rates vs. frequency mapping as part of the automatic channel plan process, according to an example embodiment.

FIG. 4 is a flow diagram illustrating a method 400 of calculating baud rates vs. frequency mapping input at 310 and/or calculated at 340, of FIG. 3. The method 400 may be executed by the controller 116 and include two stages. Stage 1 derives a GSNR along a frequency spectrum distribution and Stage 2 maps transmission data rate e.g., baud rates from the GSNR along the frequency spectrum for allowable line rates.

In one example, the input at 310 of FIG. 3 may include raw SNR values such as OSNR, GSNR, and/or GOSNR and is represented as GOSNR bursts of raw data 405. At 410, the raw data 405 is fitted or interpolated using a machine learning (ML) algorithm to obtain a GOSNR distribution 415. As an example, a step function may be used to obtain the GOSNR distribution 415 from the raw data 405.

At 420, the GOSNR distribution is converted into GSNR distribution using one of the above i.e., $$GSNR_{dB} = GOSNR_{dB} - 10 \cdot \text{Log}\left(\frac{BW}{12.5}\right),$$

where BW is the current bandwidth such as 56 GHz. As a result, a GSNR along a frequency distribution 425 is obtained.

The method 400 then proceeds to stage 2. In stage 2, at 430, allowable line rates are obtained. Specifically, using a lookup table, a line rate is selected e.g., 200 Gbits, 250 Gbits, 300 Gbits, and so on. For the selected line rate, penalties such as noise are introduced. Next, a channel center frequency within the bandwidth is selected and a GSNR value within the bandwidth is obtained from the lookup table. Next, RSNR (dB) may be calculated by subtracting penalty in decibels (dB) from the GSNR in dB. At 435, using another lookup table, the RSNR is used to find a corresponding baud rate value. This is performed for each line rate to determine allowable line rates. For each allowable line rate, a mapping 440 of baud-rate values along a frequency spectrum is obtained. The mapping 440 is derived for the allowable line rates by checking the minimum required GSNR using this other lookup table. The mapping 440 is then provided as the mapping input of operation 310 to the operation 330 of FIG. 3 or as input from 435 to operation 350 of FIG. 3. The operation 350 of FIG. 3 is explained in detail with reference to FIG. 5.

Figure 5:
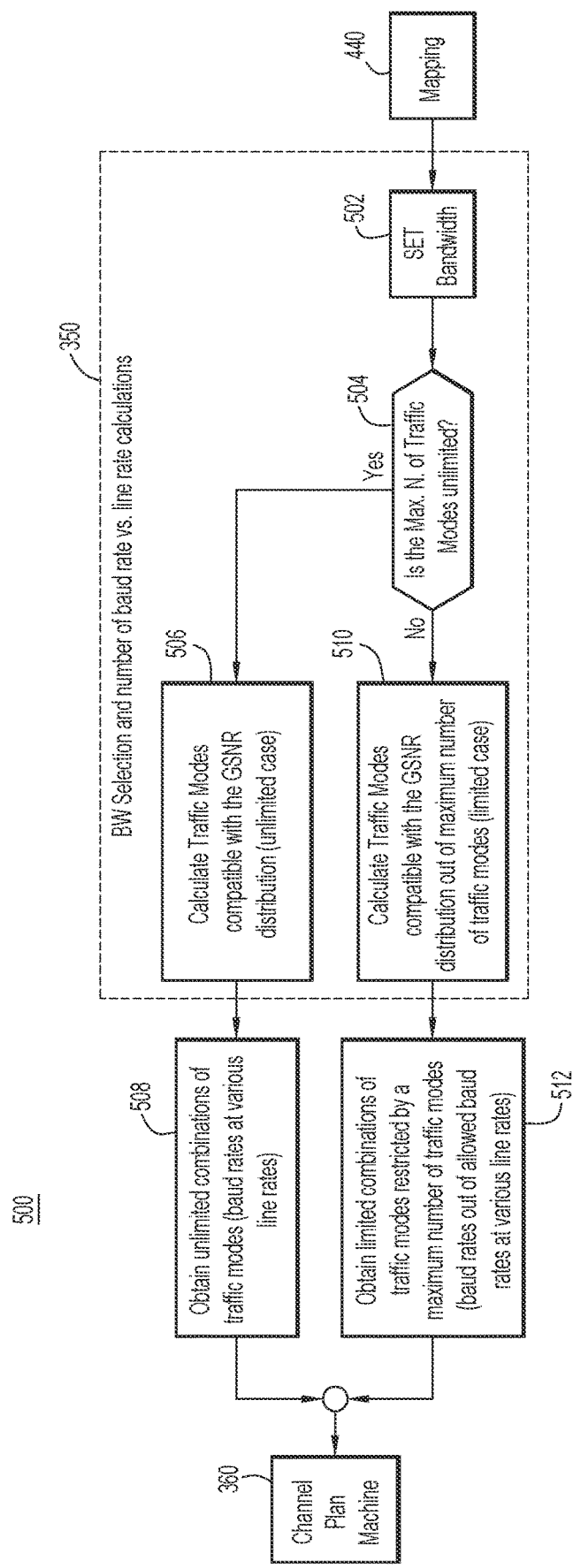
FIG. 5 is a flow diagram illustrating a method of setting bandwidth and line rates as part of the automatic channel plan process, according to an example embodiment.

FIG. 5 is a flow diagram illustrating a method 500 of setting bandwidth and line rates, according to an example embodiment.

At 502, the method 500 involves setting bandwidth of the optical link 102 that is to be allocated for transmission. The bandwidth may be the allocated bandwidth provided as network operator input at 310 of FIG. 3.

At 504, the method 500 involves determining if the network operator input at 310 of FIG. 3 includes a maximum number of traffic modes. Specifically, the controller 116 determines if any number (unlimited) of traffic modes may be used to maximize transmission capacity of the optical link 102.

If the controller 116 determines that the maximum number of traffic modes is unlimited, at 506, the controller calculates all possible traffic modes compatible with the GSNR distribution (the mapping 440). In other words, there are no restrictions with respect to the total number of channels needed to reach the maximum capacity. Unlimited combinations 508 include all possible unique combinations of various traffic modes that are determined compatible with the GSNR distribution. These unlimited combinations 508 include a combination of various baud rates at various different line rates.

For example, if the maximum line rate is 3 and includes LR1, LR2, and LR3, unlimited combinations 508 are: (1) calculating various baud rates at LR1, (2) calculating various baud rates at LR1 and at LR2, (3) calculating various baud rates at LR1 and at LR3, (4) calculating various baud rates at LR1, at LR2, and at LR3, and (5) selecting any of these unlimited combinations 508.

On the other hand, if the controller 116 determines at 504 that a maximum number of traffic modes are specified, at 510, limited combinations 512 are obtained which are unique combinations of the allowed baud rates and line rates that are calculated based on the specified number of traffic modes. In other words, a maximum capacity can be obtained with the constraint of the maximum number of traffic modes set by the network operator.

For example, if the input at 310 includes a maximum number of baud rates of 3 and line rates of 2 (LR1 and LR2), the limited combinations 512 are: (1) calculating with 3 baud rates at LR1, (2) calculating with 2 baud rates at LR1 and one baud rate at LR2, and (3) calculating with one baud rate at LR1 and 2 baud rates at LR 2.

Unlimited combinations 508 or limited combinations 512 i.e., baud rates at various line rates, are then provided as input to the channel plan machine at 360 of FIG. 3, described in more detail with reference to FIG. 6.

Figure 6:
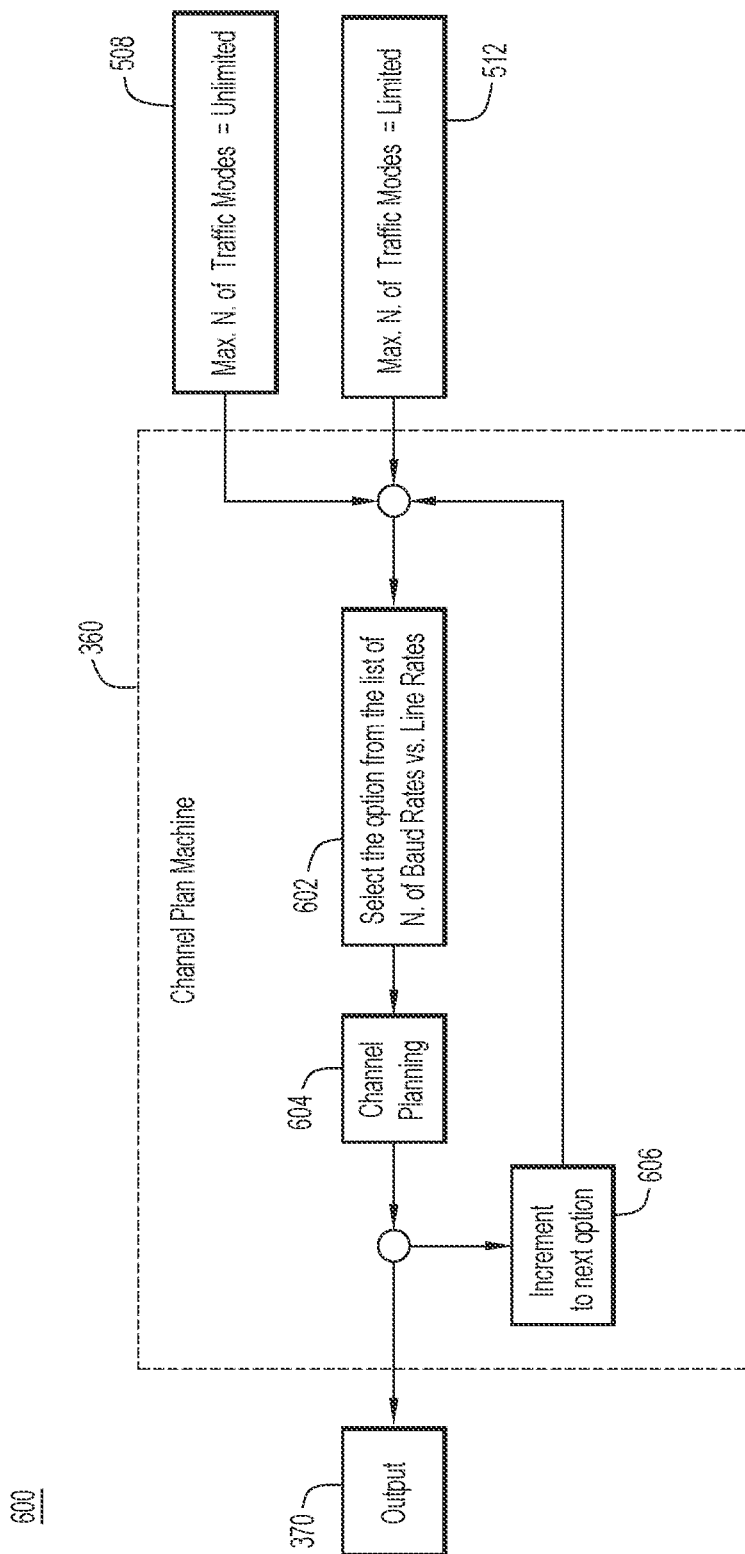
FIG. 6 is a flow diagram illustrating a method of performing channel planning to maximize transmission capacity of an optical link, according to an example embodiment.

FIG. 6 is a flow diagram of the operations of the channel plan machine 360 of FIG. 3, according to an example embodiment. The channel plan machine 360 performs a method 600 of channel planning to maximize transmission capacity of the optical link 102, according to an example embodiment.

The method 600 involves at 602, selecting an option (a first combination) from the unlimited combinations 508 or the limited combinations 512. At 604, channel planning is performed to derive channel allocations and then capacity related to the selected option.

At 606, a next option is selected (a second combination) from the unlimited combinations 508 or the limited combinations 512 and the method 600 returns to 604 and executes the channel plan machine 360 for the next option. The iterations or the iterative procedure continues until channel allocations are derived for all options. In other words, the transmission capacity of the optical link 102 related to each sequence of traffic modes is obtained and the option that results in a highest performance of the optical link 102 is selected, as output of 370 of FIG. 3.

Reference is now made to FIGS. 7-9B, which are flow diagrams illustrating the operation 604 of channel planning in further detail, according to an example embodiment. The operation 604 of channel planning calculates maximum capacity allowed by performing a bandwidth allocation technique and channel adjustments technique.

Figure 7:
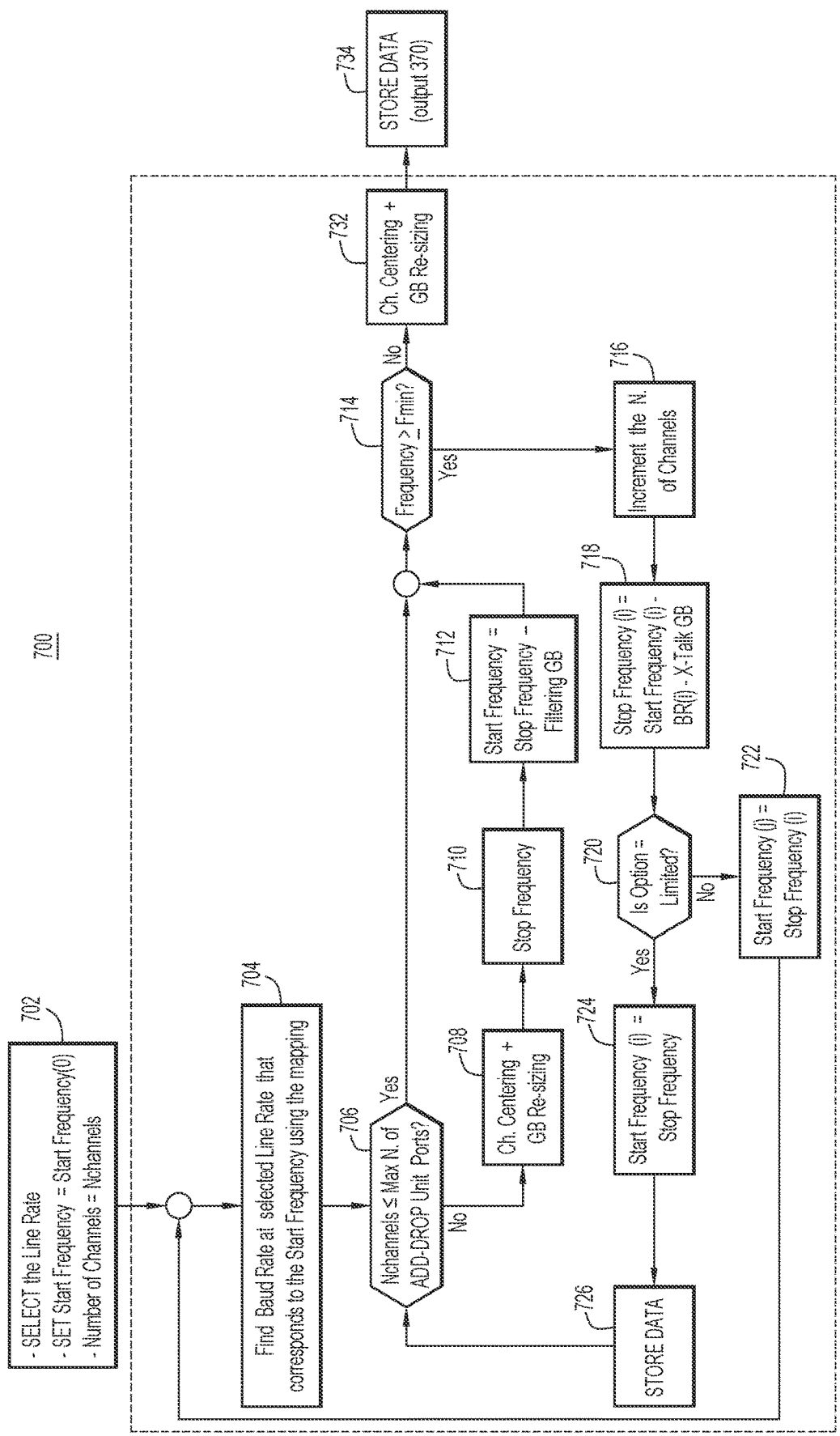
FIG. 7 is a flow diagram illustrating a method of performing bandwidth allocation of an optical link, according to an example embodiment.

FIG. 7 is a flow diagram illustrating a method 700 of performing bandwidth allocation, according to an example embodiment. The method 700 involves progressively filling the assigned bandwidth with traffic modes allowed by the GSNR distribution and is performed as an iterative procedure (a nested loop), covering each of the unlimited combinations 508 or the limited combinations 512 to derive maximum capacity for the optical link 102.

Specifically, at 702, input is obtained. The input includes one of the unlimited combinations 508 or limited combinations 512, such as the selected line rate. The start frequency (start frequency 0) and a number of channels (Nchannels) are set. If the method 700 starts from scratch i.e. from the lowest line rate (no previous data is available), the start frequency is set to Fmax i.e. the frequency corresponding to the minimum GSNR in the allowed bandwidth. Typically, the method 700 starts from the maximum frequency i.e. where the GSNR exhibits the minimum value, in such a way to assure that each subsequent operation will not lead to a value of BR that is incompatible with the corresponding GSNR. In case of a non-monotonic distribution of GSNR vs. frequency (e.g., when the slope of the GSNR vs. frequency changes along the BW, with several local minima), the method 700 is still applicable. As an example, a step-function approach can be used. In this case, the overall allowed BW is divided in sub-bands where the GSNR is monotonically distributed. Then, in each sub-band, the method 700 is applied to find the minimum local value of GSNR in each sub-band, and starting from the corresponding frequency, moving towards higher values of GSNR. In an example embodiment, this procedure (not shown in FIG. 3 for simplicity) is iteratively performed up to cover the entire bandwidth (BW).

At 704, using the mapping 440 of FIG. 4, a baud rate for the start frequency (Fmax) is obtained at the selected line rate. At 706, the number of channels is compared to a maximum number of add-drop unit ports (also obtained as input at 310 of FIG. 3). If the number of channels is equal to or greater than the maximum number of add-drop unit ports, at 708, the channels are adjusted by re-centering and resizing of the guard band (GB) and at 710, a stop frequency is obtained and at 712, the start frequency is set to the stop frequency minus filtering GB. The method 700 then proceeds to 714. On the other hand, if at 706, the number of channels is less than the maximum number of add-drop unit ports (more channels can be added), the method 700 proceeds directly to 714.

At 714, it is determined whether the frequency is greater than or equal to a minimum frequency. If the frequency is equal to or less than the minimum frequency, bandwidth allocation is complete.

If the stop frequency (frequency) is greater or equal than minimum frequency, then another channel is added. That is, at 716, the number of channels are incremented by 1 (NChannels=Nchannels+1). At 718, the stop frequency is set to include the added channel. That is, Stop Frequency(i)=Start frequency (i)+BR(i)+X-Talk GB, where i is the number of channels, start frequency (i) is a frequency at which the added channel starts, BR(i) is the frequency of the added channel, and X-Talk GB is the internal guard band added between channels.

At 720, the controller 116 determines whether a number of traffic modes has been designated, in other words, is option limited to a predetermined set of traffic modes such as the limited combinations 512. If the option is not limited, then any number of traffic modes may be used i.e., unlimited combinations 508. If the option is not limited at 722, the start frequency(i) is set to the stop frequency(i) and the method 700 returns to 704 to find another baud rate to the allocated bandwidth.

If the option is limited at 720, the controller 116 proceeds to 724 in which the Start Frequency (i) is set to Stop Frequency, and this data is stored at 726. This data is then available for a new loop (returns to 706), suitable for being used in an external nested procedure (not shown in FIG. 7, for simplicity).

If, at 714, the No path is taken, the method 700 then proceeds to 732, in which channels are adjusted by channel (Ch) centering and GB resizing. At 734, the data (output of 370 of FIG. 3) is stored and later used to configure one or more network elements such as the first node 106 and the second node 108 of FIG. 1 to establish maximum capacity of the optical link 102 in the allocated bandwidth.

Figure 8A:
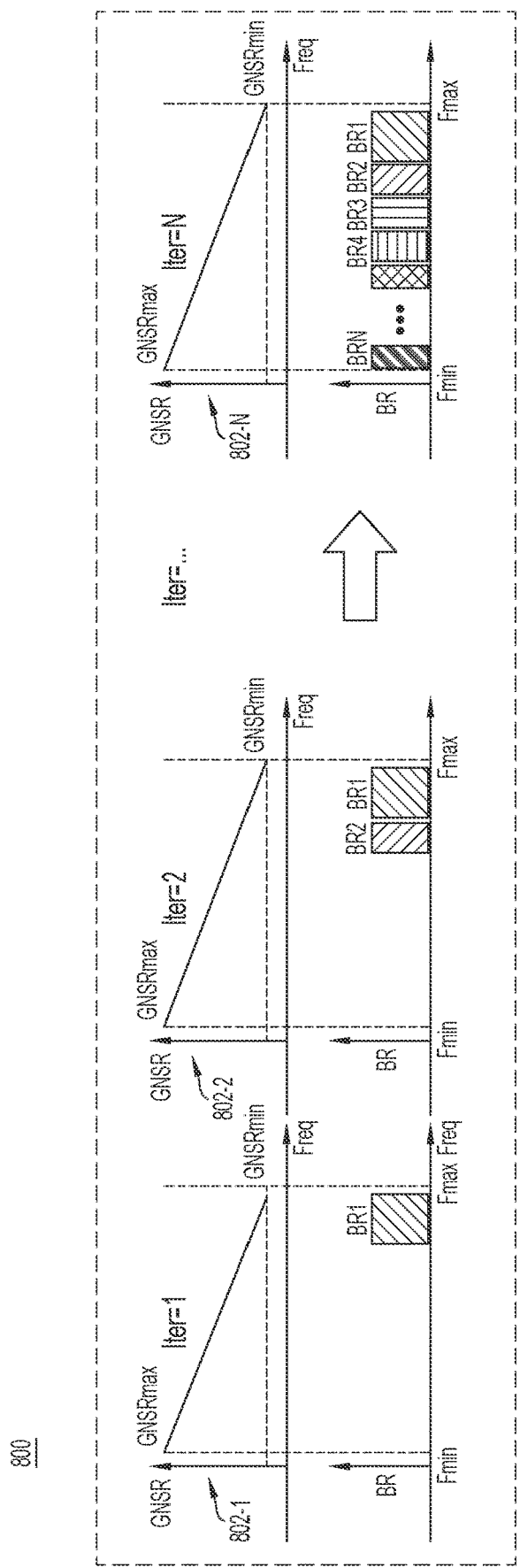
FIGS. 8A and 8B are diagrams illustrating an iterative procedure used for bandwidth allocation of the process for deriving a channel plan, according to various example embodiments.
Figure 8B:
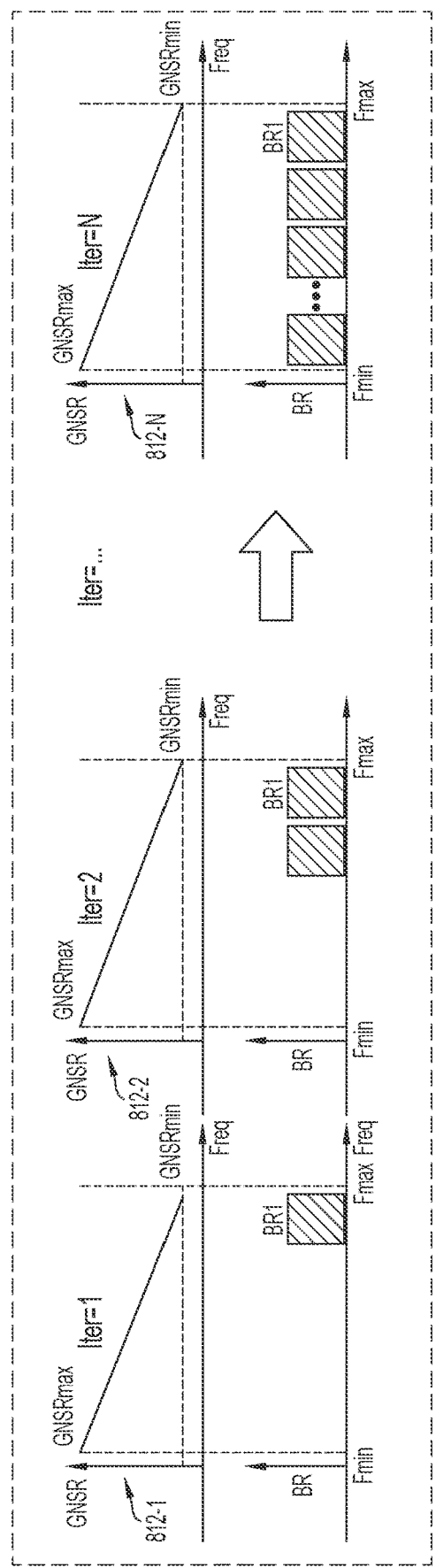

FIGS. 8A and 8B are diagrams illustrating iterative procedures of the bandwidth allocation of the method 700 of FIG. 7, according to various example embodiments.

FIG. 8A is a diagram illustrating an iterative procedure 800 for an unlimited combinations 508, according to an example embodiment. In the iterative procedure 800, the line rate is 1 and the number of traffic modes are unlimited. At a first iteration 802-1, baud rate (BR1) for the line rate 1 is selected based on the mapping 440. The start frequency is then set to the stop frequency of the BR1 plus internal guard band (GB). Since the stop frequency is greater than the minimum frequency, the number of channels is incremented by 1 and at 802-2, the next iteration, a second baud rate (BR2) is added based on the mapping 440. The frequency is reset and the iterative procedure 800 proceeds to the next iteration, and concludes with iteration N, at 802-1 to 802-N in which baud rate N (BRN) is allocated. The number of iterations depend on a particular deployment and use case scenario and the notation "1-n" denotes that a number is not limited and can vary widely.

FIG. 8B is a diagram illustrating an iterative procedure 810 for limited combinations 512, according to an example embodiment. In the example of FIG. 8B, the line rate is 1 and the maximum traffic modes is also equal to 1. In the iterative procedure 810, the same baud rate is added at each of the iterations 812-1, 812-2, ..., 812-N (iterations 1-n).

After finding a given value of BR at a corresponding frequency, this value can be maintained and added to the previous one step-by-step without any concern, because the corresponding GSNR values result always crescent. In this way it is possible to iteratively create an incremental succession of channels at the same baud rate of FIG. 8B or at different baud rates of FIG. 8A without any issue.

In summary, the bandwidth allocation process is executed by looking up the mapping 440 of baud rates along a frequency spectrum at each line rate and filling the allocated bandwidth with the traffic modes that are compatible with the GSNR distribution. This process is carried out starting from the lowest line rate (chosen by the network operator/user among the ensemble of line rates compatible with the GSNR distribution or by the mapping 440), at the maximum frequency, and proceeds towards enhancing the line rate. This bandwidth allocation process is performed by analyzing each line rate individually, or by re-using the data stored in the previous iterations as a new starting point. For this reason, it can be inserted in an iterative procedure 800 or 810, for all possible combinations of traffic modes (unlimited combinations 508 or limited combinations 512) leading to the maximum capacity.

Figure 9A:
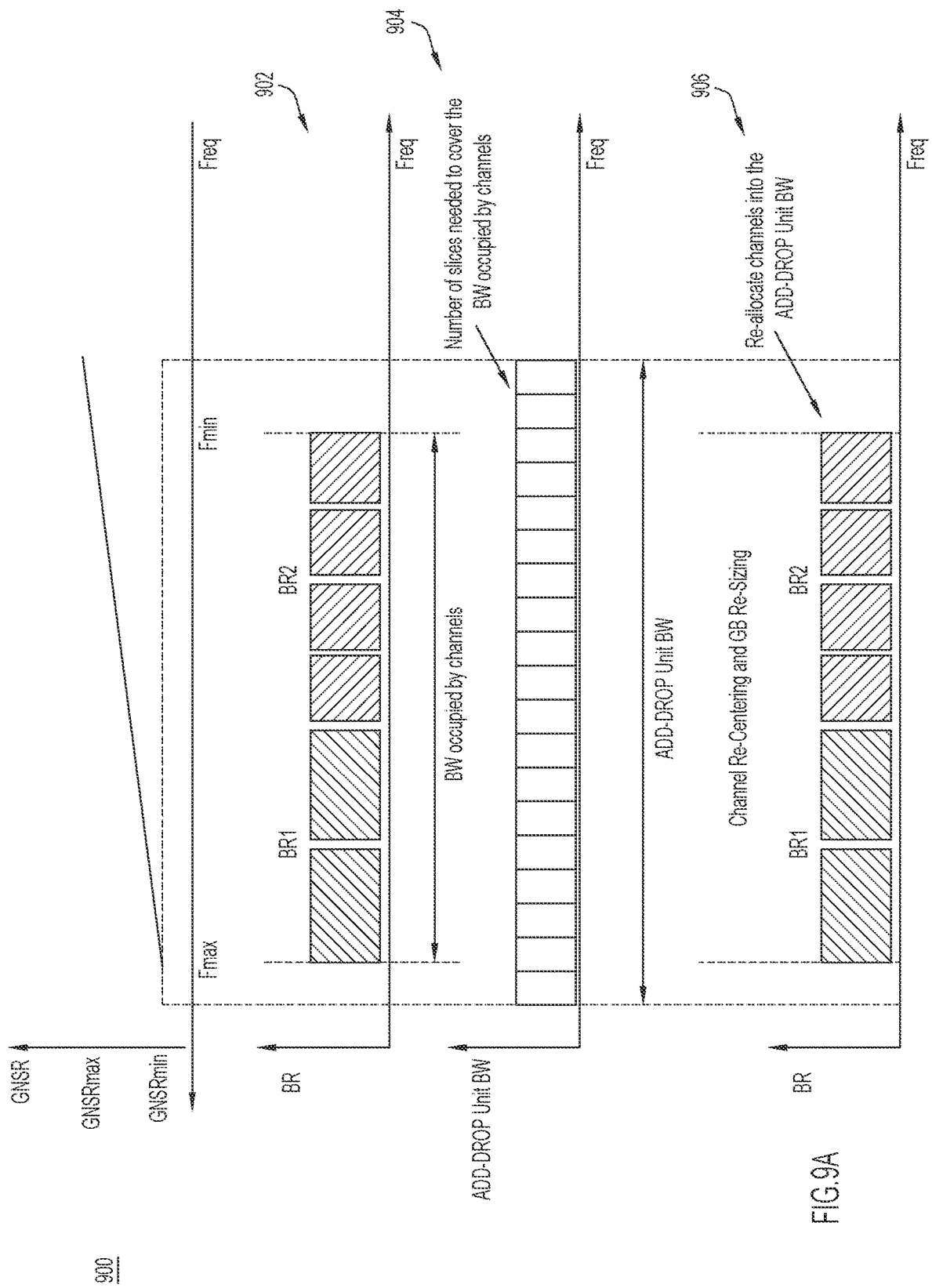
FIGS. 9A and 9B are diagram illustrating channel adjustments techniques used in the automatic channel plan process, according to an example embodiment.
Figure 9B:
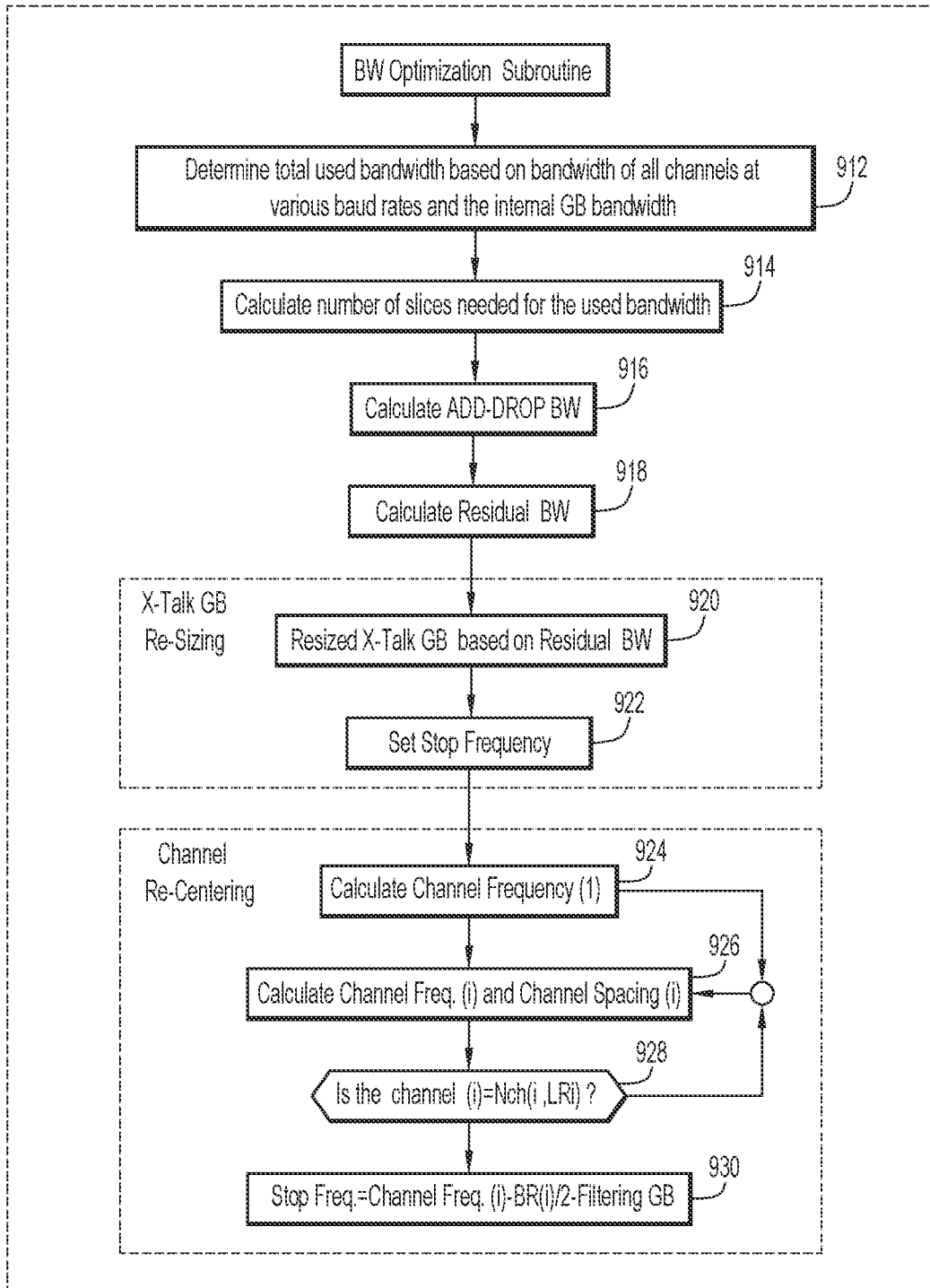

Referring next to FIGS. 9A and 9B, which are diagrams that illustrate channel adjustments technique of the operation 604 of channel planning of FIG. 6.

FIG. 9A is a diagram illustrating a method 900 of adjusting channels by resizing an internal guard band (GB) and re-centering the channels into the allocated bandwidth, according to an example embodiment. The method 900 includes GB re-sizing and channel re-centering. The method 900 involves adjusting the center frequencies of the channels found at each execution of the iterative procedure 800 or 810 (the method 700 of FIG. 7) based on the input at 210 of FIG. 2 such as the number of ADD-DROP units at both ends of the optical link 102.

[moo] As an example of execution, in FIG. 9A, the method 900 involves matching of the add-drop unit bandwidth with two baud-rates (BR1 and BR2). At 902, channels with BR1 and BR2 are allocated into the allocated bandwidth. At 904, the controller 116 determines a number of slices (ADD-DROP units) needed to cover the bandwidth occupied with the channels. At 906, the channels are re-centered and guard band resized, such as the channels align to the number of slices. The method 900 can be applied with any distribution of traffic modes.

FIG. 9B is a flow diagram illustrating a method 910 of performing channel adjustments, according to an example embodiment. After the bandwidth allocation technique (the method 700 of FIG. 7) is performed, the method 910 is performed by the controller 116. At 912, the bandwidth for the channels is determined and includes frequency of each channel for the number of channels at each baud rate time plus the internal guard band (GB) between the channels. Specifically, BW=NchTot(BR1)*BR1+NchTot(BR2)*BR2+ . . . +NchTot(BRn)*BRn+[NchTot(BR1)•+NchTot(BR2)•+ . . . +NchTot(BRn)−1] *internal GB. Internal GB prevents interference (x-talk) between neighboring channels.

At 914, determine number of bandwidth slices needed for the used bandwidth (BW). That is, the controller calculates the needed number of slices (Nslices) as follows: Nslices=INT [(2*Filtering GB+BW)/SliceBW]+1, where Filtering GB is right and left guard bands, BW is the occupied bandwidth, and sliceBW is slices provided by the add and drop units of the network nodes (the first node 106 and the second node 108) to establish the optical link 102.

At 916, the bandwidth of the add and drop units is calculated which is equal to number of slices time the bandwidth of each slice (ADD-DROP BW=Nslices*SliceBW).

At 918, the residual or remaining bandwidth is calculated based on the ADD-DROP BW at 916 and BW at 912 and the two filtering GBs at 914. Residual BW=ADD-DROP BW−(BW+2*Filtering GB).

Based on the obtained values at 912-918, internal guard band resizing is performed at 920 and 922 and channel re-centering is performed at 924 and 926. Specifically, at 920 the internal guard band (X-talk GB) is resized based on the residual BW. For example, resized X-Talk GB=Internal GB+Residual BW/[NchTot(BR1)•+NchTot(BR2)•+ . . . +NchTot(BRN)−1]. At 922, the stop frequency is set. The stop frequency=start frequency minus number of slices (Nslice)*SliceBW. In other words, the stop frequency is set to leave room for the right guard band (one filtering GB).

Next, the channels are re-centered as follows. At 924, a center for the first channel is calculated. The center of the first channel is channel frequency (1). Channel Frequency 1 is calculated based on the starting frequency—the left guard band (one filtering GB) and based on a first baud rate (Channel Freq. (1)=Start Freq.−Filtering GB—BR(1)/2).

At 926, the remaining channels are iteratively re-centered and spaced based on the frequency of the previous channel and the re-sized internal GB. Specifically, channel frequency (i)=channel frequency (i−1)−Resized X-Talk GB (i−1)−[BR (i)+BR(i−1)]/2. Channel spacing (i)=Channel Freq. (i)−Channel Freq. (i−1), where i is second channel, third channel, . . . , nth channel.

At 928, the controller 116 determines whether all the channels been re-centered and re-sized i.e., the current channel(i)=Nch(i, LRi). If not, the method 910 proceeds to 926 to re-center and re-size the channels for the next baud rate and/or line rate. If all channels are re-centered and re-sized, at 930, the stop frequency is set (Stop Freq.=Channel Freq. (i)–BR(i)/2–Filtering GB).

The method 910 adjusts channel frequencies and corresponding "mutual distances" (in frequency units) among the channels (X-Talk GBs) within each ADD-DROP unit that is present at both ends of the optical link 102. In some cases, the adjustments of the method 910 are required for each ADD-DROP unit but may vary depending on a particular configuration of the network node. In one example embodiment, this method 910 is applied only once on an overall bandwidth irrespective of the presence of the ADD-DROP units in the allocated bandwidth.

In summary, the techniques presented above operate as a predictive process that generates a channel plan or a traffic mode distribution that maximizes the capacity of the allocated bandwidth of the optical link 102 based on various possible combinations of line rates and transmission data rates. The optical link 102 is established from scratch (at an installation phase) with maximized performance using the derived channel plan. Unlike the related art, the channel plan is derived experimentally without testing the optical link in real-time to obtain various performance parameters. The channel plan allows for an initial installation of the optical link 102 without the need of various retuning at the field (after the installation).

Specifically, the techniques present above estimate a distribution of transmission data rate and line rates in a predetermined amount of an optical bandwidth to maximize transmission capacity before testing or tuning the optical link 102. If a tuning was requested for the performance of the link in real-time without using a blind approach, it would be a guess-point for the tuning on the field, or a way to exploit the BR vs. frequency trend derived experimentally by a tuning performed in real-time with a blind approach.

The techniques obtain certain information (GSNR min/max/avg, SNR margin, etc.) of the optical link 102 and a number of allowed traffic modes, derive a distribution of GSNR along a frequency spectrum of the allowed bandwidth, generate a corresponding mapping of transmission data rates along the frequency spectrum for each line rate compatible with the distribution, and derive the optical bandwidth and the maximum number of traffic modes. For example, if the maximum number of traffic modes is designated, the maximum capacity is derived using no more than the maximum number of traffic modes. If the maximum number of traffic modes is not designated, a maximum capacity is derived regardless of the total number of channels needed to reach it (using any number of traffic modes). The techniques generate a channel plan that includes a number of traffic modes and channel distribution based on the determined maximum capacity, determined number of traffic modes, and link characteristics. The channel plan progressively fills the bandwidth with traffic modes allowed by the GSNR distribution to obtain a maximum capacity (in an iterative procedure). Additionally, channel re-centering and guard band re-sizing may be performed based on characteristics of the add-drop multiplexers/de-multiplexers installed at the first node 106 and/or the second node 108.

By exploring each sequence of traffic modes, the channel plan provides highest performance of the optical link 102. The channel plan includes a list of configuration parameters such as start and stop frequencies, number of channels that can be allocated in the allowed bandwidth, channel line rates, channel transmission data rates, channel center frequencies, channel spacing, and/or channel powers. This channel plan allows a network operator to install a proper number of line card and perform configuration of one or more optical network elements in the optical network to establish the optical link 102 with maximized transmission capacity.

Figure 10:
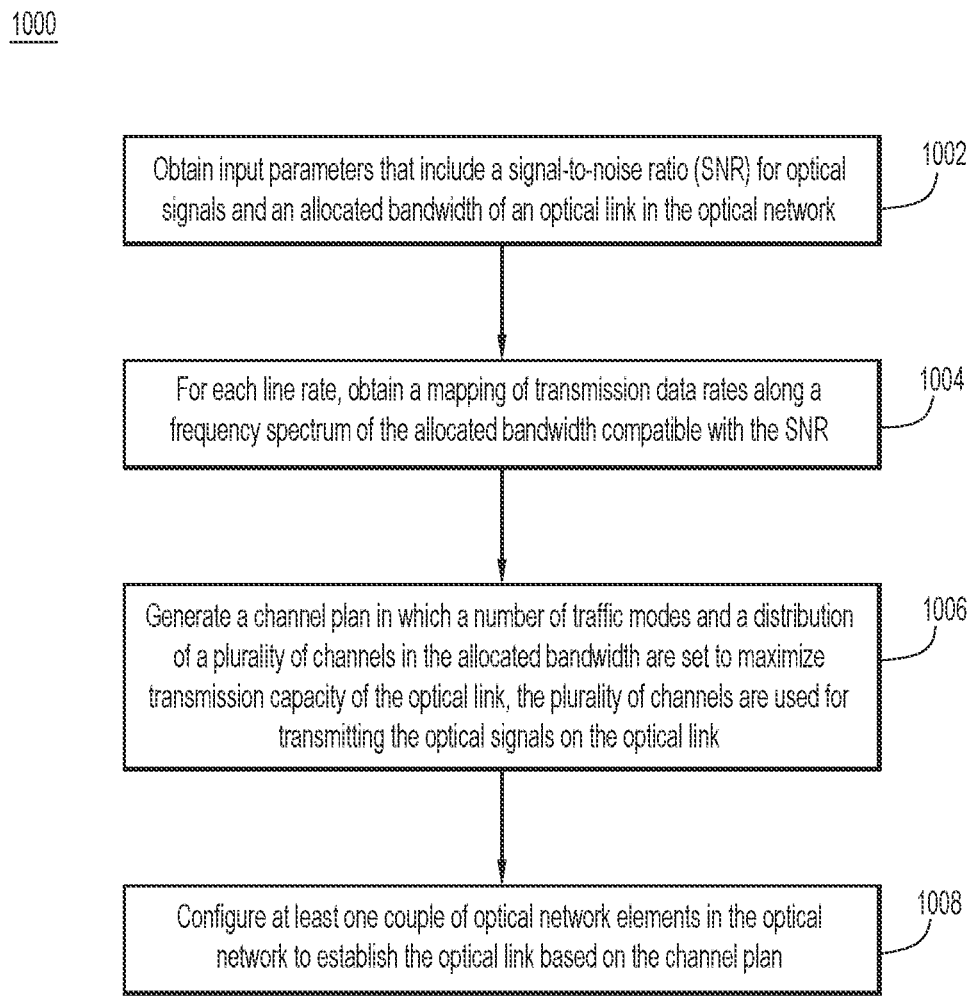
FIG. 10 is a flowchart illustrating a method of configuring one or more network elements to establish an optical link, according to an example embodiment.

FIG. 10 illustrates a flow chart of a method 1000 for configuring transmission capacity of an optical link, according to an example embodiment. The method 1000 is performed by a controller of an optical network e.g., the controller 116 shown in FIG. 1.

The method 1000 involves at 1002, the controller obtaining input parameters that include a signal-to-noise ratio (SNR) for optical signals and an allocated bandwidth of an optical link in the optical network.

At 1004, the method 1000 involves the controller obtaining, for each line rate, a mapping of transmission data rates along a frequency spectrum of the allocated bandwidth compatible with the SNR.

At 1006, the method 1000 involves the controller generating a channel plan in which a number of traffic modes and a distribution of a plurality of channels in the allocated bandwidth are set to maximize transmission capacity of the optical link. The plurality of channels is used for transmitting the optical signals on the optical link.

At 1008, the method 1000 involves the controller configuring at least one couple of optical network elements in the optical network to establish the optical link based on the channel plan. That is, a pair of optical network elements at both ends of a bi-directional link are configured such as an optical interface made of transmitter and receiver at a near-end of the optical link and an optical interface made of transmitter and receiver at a far-end of the optical link.

In at least some cases, the operation 1004 of obtaining the mapping may include obtaining a distribution of generalized SNR (GSNR) along the frequency spectrum based on the input parameters using an interpolation technique, obtaining allowable line rates from among a plurality of line rates by introducing penalties for each of the plurality of line rates and determining whether a respective line rate meets a minimum required GSNR, and obtaining the transmission data rates along the frequency spectrum by performing a lookup operation for each of the allowable line rates.

In one or more example embodiments, the method 1000 may involve the controller calculating a plurality of traffic modes for each of the allowable line rates.

In at least one instance, the method 1000 may involve the controller calculating a plurality of unique combinations of a line rate from the allowable line rates and a transmission data rate from the transmission data rates. Each of the plurality of unique combinations is compatible with the distribution of the GSNR.

In one form, the operation 1006 of the controller generating the channel plan may include, for each of the plurality of unique combinations, calculating a number of channels and a channel spacing to maximize the transmission capacity of the optical link and selecting one of the plurality of unique combinations that provides a highest transmission capacity of the optical link.

According to one or more example embodiments, the method 1000 may further involve obtaining a distribution of generalized SNR (GSNR) along the frequency spectrum based on the input parameters using an interpolation technique. The operation 1006 of generating the channel plan may include performing an iterative procedure in which for said each line rate, a look up operation is performed for filling the allocated bandwidth with a plurality of traffic modes compatible with the distribution of GSNR and selecting a combination of traffic modes from the plurality of traffic modes, that maximizes the transmission capacity of the optical link.

In at least some instances, the operation of performing the iterative procedure may include, for each iteration, adjusting center frequencies and guard bands of the plurality of channels based on the input parameters that further include information about add and drop units of the optical link.

According to one or more example embodiments, the operation 1006 of generating the channel plan may include allocating the plurality of channels into the allocated bandwidth and spacing the plurality of channels to maximize the transmission capacity. The transmission data rates are baud-rates.

FIG. 11 is a hardware block diagram of a computing device 1100 that may perform functions associated with any combination of operations in connection with the techniques depicted in FIGS. 1-10, according to various example embodiments, including, but not limited to, operations of the controller 116 of FIG. 1. It should be appreciated that FIG. 11 provides only an illustration of one embodiment and does not imply any limitations with regard to the environments in which different embodiments may be implemented. Many modifications to the depicted environment may be made.

In at least one embodiment, computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with one or more memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, and/or any other I/O port(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computer device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 1116 (a display screen or a computer monitor), or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as one of the controller 116 of FIG. 1 and/or the computing device 1100 of FIG. 11. The apparatus includes a communication interface configured to enable network communications, a memory configured to store executable instructions, and a processor coupled to the communication interface and the memory. The processor is configured to perform various operations. The operations include obtaining input parameters that include a signal-to-noise ratio (SNR) for optical signals and an allocated bandwidth of an optical link in the optical network and obtaining, for each line rate, a mapping of transmission data rates along a frequency spectrum of the allocated bandwidth compatible with the SNR. The operations further include generating a channel plan in which a number of traffic modes and a distribution of a plurality of channels in the allocated bandwidth are set to maximize transmission capacity of the optical link. The plurality of channels is used for transmitting the optical signals on the optical link. The operations further include configuring at least one couple of optical network elements in the optical network to establish the optical link based on the channel plan.

In yet another example embodiment, one or more non-transitory computer readable storage media encoded with instructions are provided. When the media is executed by a processor, the instructions cause the processor to execute a method involving obtaining input parameters that include a signal-to-noise ratio (SNR) for optical signals and an allocated bandwidth of an optical link in the optical network and obtaining, for each line rate, a mapping of transmission data rates along a frequency spectrum of the allocated bandwidth compatible with the SNR. The method further involves generating a channel plan in which a number of traffic modes and a distribution of a plurality of channels in the allocated bandwidth are set to maximize transmission capacity of the optical link. The plurality of channels is used for transmitting the optical signals on the optical link. The method may further involve configuring at least one couple of optical network elements in the optical network to establish the optical link based on the channel plan.

In yet another example embodiment, a system is provided that includes the devices and operations explained above with reference to FIGS. 1-10.

The programs described herein (e.g., control logic 1120) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1106 and/or memory elements(s) 1104 can store data, software, code, instructions (e.g., processor instructions), logic, parameters, combinations thereof, and/or the like used for operations described herein. This includes the storage 1106 and/or memory elements(s) 1104 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a controller of an optical network, input parameters that include a signal-to-noise ratio (SNR) for optical signals and an allocated bandwidth of an optical link in the optical network;
    obtaining, by the controller, a mapping of transmission data rates along a frequency spectrum of the allocated bandwidth compatible with the SNR;
    generating, by the controller, a channel plan in which a number of traffic modes and a distribution of a plurality of channels in the allocated bandwidth are set to maximize transmission capacity of the optical link by performing an iterative procedure in which the allocated bandwidth is filled with a plurality of traffic modes compatible with the SNR and by selecting a combination of traffic modes from the plurality of traffic modes that maximizes the transmission capacity of the optical link, wherein the plurality of channels is used for transmitting the optical signals on the optical link; and
    configuring, by the controller, at least one couple of optical network elements in the optical network, to establish the optical link based on the channel plan.

2. The method of claim 1, further comprising:
    obtaining a distribution of generalized SNR (GSNR) along the frequency spectrum based on the input parameters using an interpolation technique;
    wherein performing the iterative procedure includes a look up operation for filling the allocated bandwidth with the plurality of traffic modes compatible with the distribution of the GSNR.

3. The method of claim 2, wherein performing the iterative procedure includes:
    for each iteration, adjusting center frequencies and guard bands of the plurality of channels based on the input parameters that further include information about add and drop units of the optical link.

4. The method of claim 1, wherein generating the channel plan includes:
    allocating the plurality of channels into the allocated bandwidth and spacing the plurality of channels to maximize the transmission capacity, wherein the transmission data rates are baud-rates.

5. The method of claim 1, wherein obtaining the mapping of the transmission data rates along the frequency spectrum of the allocated bandwidth compatible with the SNR includes:
    obtaining at least one allowable line rate from among a plurality of line rates by introducing penalties for each of the plurality of line rates and determining whether a respective line rate meets a minimum required SNR (RSNR); and
    obtaining the transmission data rates along the frequency spectrum by performing a lookup operation for each of the at least one allowable line rate.

6. The method of claim 1, wherein the channel plan includes a list of configuration parameters including one or more of: start and stop frequencies for the allocated bandwidth of the optical link, a number of channels that can be allocated in the allocated bandwidth, channel line rates, channel transmission data rates, channel center frequencies, channel spacing, or channel powers.

7. An apparatus comprising:
    a communication interface configured to enable network communications;
    a memory configured to store executable instructions; and
    a processor coupled to the communication interface and the memory and configured to perform operations including:
        obtaining input parameters that include a signal-to-noise ratio (SNR) for optical signals and an allocated bandwidth of an optical link in an optical network;
        obtaining a mapping of transmission data rates along a frequency spectrum of the allocated bandwidth compatible with the SNR;
        generating a channel plan in which a number of traffic modes and a distribution of a plurality of channels in the allocated bandwidth are set to maximize transmission capacity of the optical link by performing an iterative procedure in which the allocated bandwidth is filled with a plurality of traffic modes compatible with the SNR and by selecting a combination of traffic modes from the plurality of traffic modes that maximizes the transmission capacity of the optical link, wherein the plurality of channels is used for transmitting the optical signals on the optical link; and
        configuring at least one couple of optical network elements in the optical network to establish the optical link based on the channel plan.

8. The apparatus of claim 7, the processor is configured to obtain the mapping by:
    obtaining a distribution of generalized SNR (GSNR) along the frequency spectrum based on the input parameters using an interpolation technique;
    obtaining allowable line rates from among a plurality of line rates by introducing penalties for each of the plurality of line rates and determining whether a respective line rate meets a minimum required SNR (RSNR); and
    obtaining the transmission data rates along the frequency spectrum by performing a lookup operation for each of the allowable line rates.

9. The apparatus of claim 8, wherein the processor is further configured to:
    calculate a plurality of traffic modes for each of the allowable line rates.

10. The apparatus of claim 8, wherein the processor is further configured to:
    calculate a plurality of unique combinations of a line rate from the allowable line rates and a transmission data rate from the transmission data rates, wherein each of the plurality of unique combinations is compatible with the distribution of the GSNR.

11. The apparatus of claim 10, wherein the processor is configured to generate the channel plan by:
    for each of the plurality of unique combinations, calculating a number of channels and a channel spacing to maximize the transmission capacity of the optical link; and
    selecting one of the plurality of unique combinations that provides a highest transmission capacity of the optical link.

12. The apparatus of claim 7, wherein the processor is further configured to perform an operation comprising:
    obtaining a distribution of generalized SNR (GSNR) along the frequency spectrum based on the input parameters using an interpolation technique,
    wherein the processor is configured to perform the iterative procedure by:
        performing a look up operation for filling the allocated bandwidth with the plurality of traffic modes compatible with the distribution of the GSNR.

13. The apparatus of claim 12, wherein the processor is configured to perform the iterative procedure by:
    adjusting, for each iteration, center frequencies and guard bands of the plurality of channels based on the input parameters that further include information about add and drop units of the optical link.

14. The apparatus of claim 7, wherein the processor is configured to generate the channel plan by:
    allocating the plurality of channels into the allocated bandwidth and spacing the plurality of channels to maximize the transmission capacity, wherein the transmission data rates are baud-rates.

15. A method comprising:
    obtaining, by a controller of an optical network, input parameters that include a signal-to-noise ratio (SNR) for optical signals and an allocated bandwidth of an optical link in the optical network;
    obtaining, by the controller, a mapping of transmission data rates along a frequency spectrum of the allocated bandwidth compatible with the SNR by:
        obtaining at least one allowable line rate from among a plurality of line rates by introducing penalties for each of the plurality of line rates and determining whether a respective line rate meets a minimum required SNR (RSNR), and
        obtaining the transmission data rates along the frequency spectrum by performing a lookup operation for each of the at least one allowable line rate;
    generating, by the controller, a channel plan in which a number of traffic modes and a distribution of a plurality of channels in the allocated bandwidth are set to maximize transmission capacity of the optical link, wherein the plurality of channels is used for transmitting the optical signals on the optical link; and
    configuring, by the controller, at least one couple of optical network elements in the optical network, to establish the optical link based on the channel plan.

16. The method of claim 15, further comprising:
    calculating, by the controller, a plurality of traffic modes for each of the allowable line rates.

17. The method of claim 15, further comprising:
calculating, by the controller, a plurality of unique combinations of a line rate from the allowable line rates and a transmission data rate from the transmission data rates, wherein each of the plurality of unique combinations is compatible with the distribution of the SNR.

18. The method of claim 17, wherein generating the channel plan includes:
for each of the plurality of unique combinations, calculating a number of channels and a channel spacing, to maximize the transmission capacity of the optical link; and
selecting one of the plurality of unique combinations that provides a highest transmission capacity of the optical link.

19. The method of claim 15, wherein generating the channel plan includes:
allocating the plurality of channels into the allocated bandwidth and spacing the plurality of channels to maximize the transmission capacity.

20. The method of claim 15, wherein the transmission data rates are baud-rates.

\* \* \* \* \*

UNITED STATES PATENT AND TRADEMARK OFFICE
CERTIFICATE OF CORRECTION

PATENT NO. : 11,581,952 B2
APPLICATION NO. : 17/352705
DATED : February 14, 2023
INVENTOR(S) : Claudio Crognale et al.

Page 1 of 1

It is certified that error appears in the above-identified patent and that said Letters Patent is hereby corrected as shown below:

In the Claims

Claim 2, Column 20, Line 51, please replace "parameters using an interpolation technique;" with --parameters using an interpolation technique,--

Signed and Sealed this
Twenty-sixth Day of December, 2023

Katherine Kelly Vidal
*Director of the United States Patent and Trademark Office*